April 3, 1951 J. H. EGY 2,547,453
VARIABLE-SPEED TRANSMISSION DEVICE
Filed Sept. 17, 1947 3 Sheets-Sheet 1
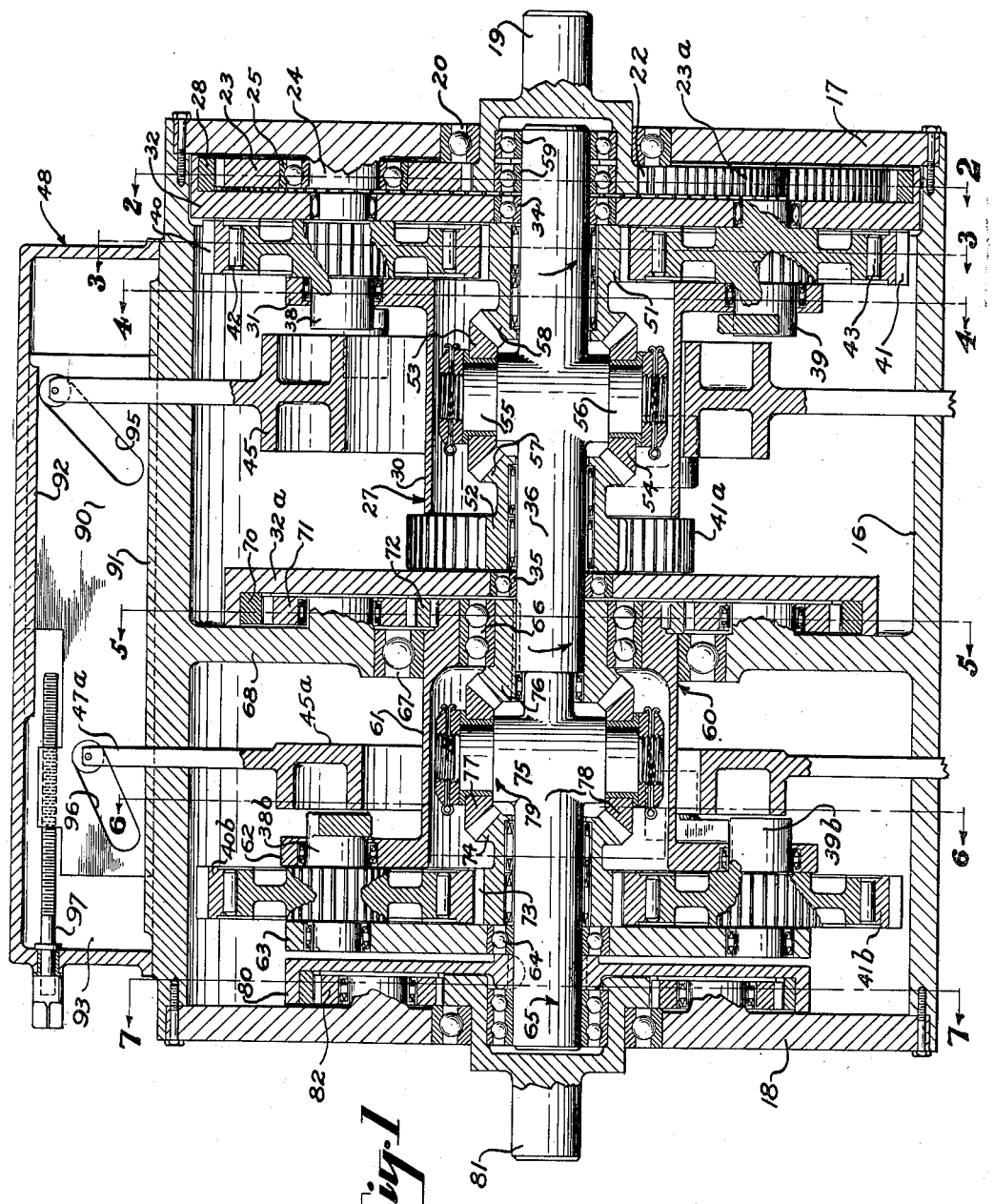
INVENTOR.
JOSEPH H. EGY
BY *Fay, Golrick & Fay*
ATTORNEYS April 3, 1951 J. H. EGY 2,547,453
VARIABLE-SPEED TRANSMISSION DEVICE
Filed Sept. 17, 1947 3 Sheets-Sheet 2
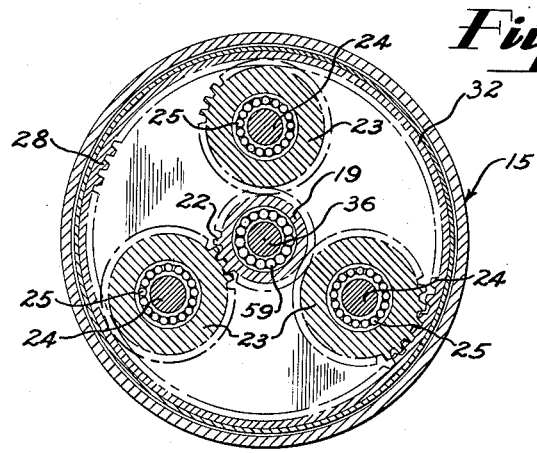
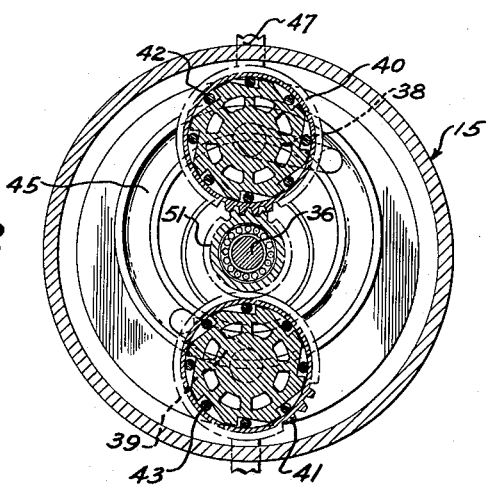
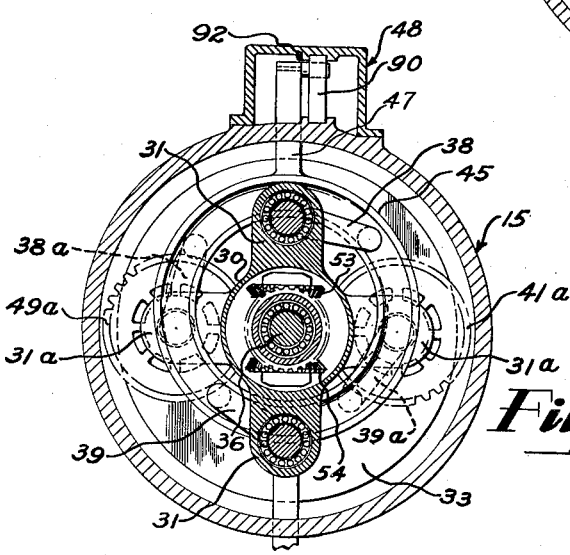
INVENTOR.
JOSEPH H. EGY
BY Fay, Golrick & Fay
ATTORNEYS April 3, 1951     J. H. EGY     2,547,453

VARIABLE-SPEED TRANSMISSION DEVICE

Filed Sept. 17, 1947     3 Sheets—Sheet 3

INVENTOR.
JOSEPH H. EGY
BY Fay, Golrick & Fay
ATTORNEYS

Patented Apr. 3, 1951

2,547,453

UNITED STATES PATENT OFFICE 2,547,453

VARIABLE-SPEED TRANSMISSION DEVICE

Joseph H. Egy, Enon, Ohio

Application September 17, 1947, Serial No. 774,635

9 Claims. (Cl. 74—679)

The present invention relates to a torque transmission mechanism which permits an infinite of variations between limits, in the output speed and which provides a torque output of substantially constant speed for any given speed adjustment.

One object of the invention is to provide a torque transmission device in which uneven torque impulses (resulting in uneven speeds of a torque member) are cancelled out or nullified so that the ultimate torque output is substantially constant.

Another object of the invention is to provide a torque transmission device which may be adjusted so that the speed of the output may be held substantially constant regardless of variation in the input speed.

Still another object of the invention is to provide a variable speed transmission device in which the variation in speed output is obtained by adjusting the degree of eccentricity of one member relative to another member during relative rotation of the members to produce oscillations in certain torque elements which oscillations are utilized, in part, to transmit torque, and wherein the periodic accelerations of certain oscillating torque transmitting elements are cancelled out by corresponding accelerations of other torque transmitting elements so that a substantially non-fluctuating torque output is produced.

Figure 5:
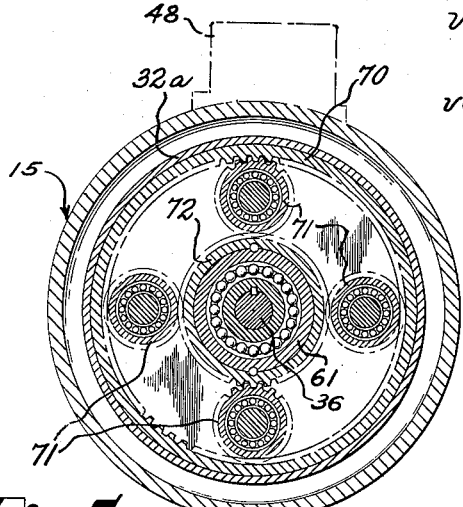
Figure 8:
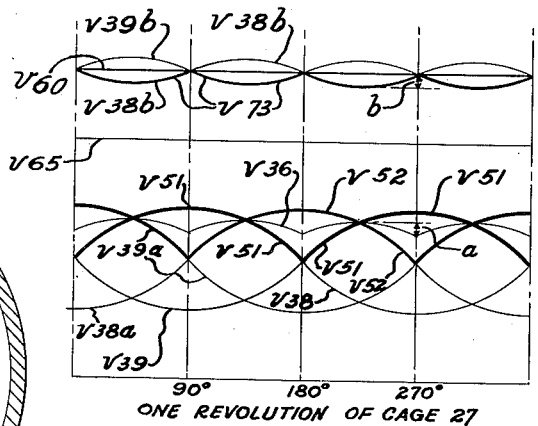
Figure 6:
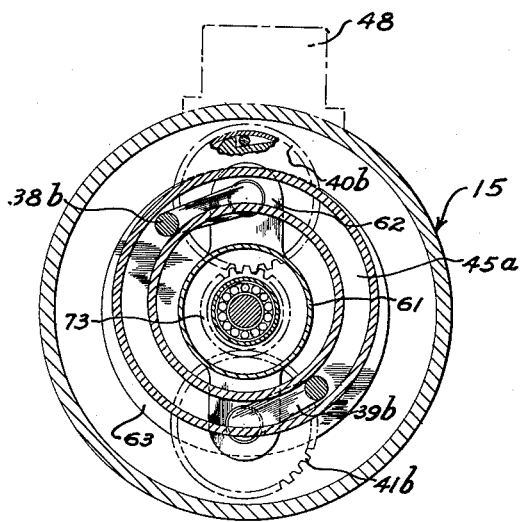
Figure 7:
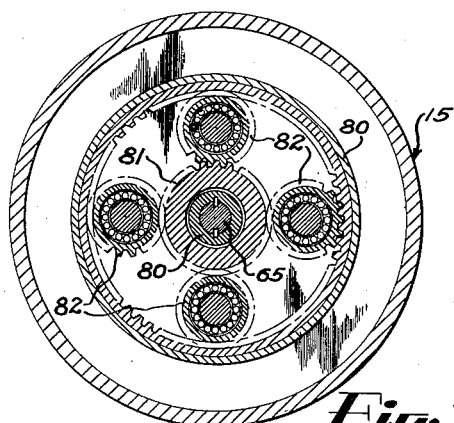

Other objects and advantages of the invention will be apparent from the following description of a preferred form of embodiment of the invention, reference being made to the accompanying drawings wherein:

Fig. 1 is a longitudinal view in section of a variable speed transmission device;

Figs. 2, 3, 4, 5, 6 and 7 are sectional views of the transmission taken on lines 2—2, 3—3, 4—4, 5—5, 6—6 and 7—7, respectively, but on a smaller scale. Certain elements of the transmission are omitted in these views;

Fig. 8 is a graph showing the relative velocities of various elements of the mechanisms for one speed setting with a constant speed input.

In general, the invention consists in providing two power output units in which the torque output of each is uneven in speed, i. e., the speed varies above or below a given velocity in the nature of impulses, and which units are driven from a common source of power and each unit drives an input of a differential, respectively, in such a manner that the acceleration impulses above a given velocity in the torque of one input of the differential, for example, are cancelled by similar impulses of the other torque input. In the present form of the invention, each unit is the eccentric crank drive type and consists of a rotating cage which carries a plurality of cranks and the cranks are adapted to be oscillated when the cage rotates by the ends of the crank arms being guided by a circular cam which may be adjusted eccentric with relation to the axis of rotation of the cage. Each crank has a planetary gear associated therewith and these gears are also carried by the cage and they mesh with a sun gear of a power output element. A clutching mechanism is provided between each crank and its associated planetary gear, which clutches are effective to connect the crank and gear during one phase of oscillation of the cranks only. The cranks are oscillated at a velocity having a substantially sine characteristic in which the oscillation of the crank will increase to a maximum then decrease to a maximum in the opposite direction. Thus, the sun gear will be driven at the speed of rotation of the cage plus the velocity of the planetary gears during the time the gears and cranks are clutched, and it is recognized in the art that the velocity of the sun gears will be constantly varying by the crank motions so that the speed of the sun gears will be uneven. It is the purpose of this invention to provide a mechanism in which the uneven velocities or impulses above a given velocity imparted to the driven sun gears are cancelled out or substantially eliminated in the output of the speed transmission. This is accomplished by causing one of the power output units to be driven at a greater speed than the other, for example, at twice the speed of the other while the variable speed impulses correspond to the amplitude and rate of the impulses of the other, and the output elements of each unit are adapted to drive, respectively, the two input gears of a differential gearing, one input gear being driven in one direction and the other gear in the opposite direction whereby the speed variations due to the oscillation of the cranks will be substantially cancelled out in the differential gearing mechanism.

Referring now to the drawings, there is shown a speed transmission device which is enclosed in a suitable housing 15, which housing includes a cylindrical shell 16 closed at opposite ends by walls 17 and 18 secured to the shell. A torque input shaft 19 is journalled in end wall 17 by a bearing 20 and the inner end of the shaft 19 is provided with a pinion gear formation 22. The pinion 22 is adapted to mesh with three gears 23, which are mounted on studs 24 on the wall 17 by bearings 25.

The gears 23 are adapted to drive a cage 27 through an internal gear ring 28 mounted on one end of the cage. The cage 27 comprises a central tubular section 30 having opposed radially extending arms 31 and 31a and end walls 32 and 32a. The arms 31 are 90° to arms 31a as may be seen in Fig. 4. The cage 27 is journalled for rotation about its axis on bearings 34 and 35 which are mounted on a shaft 36, which will be described in greater detail hereinafter. Two cranks 38 and 39 having shafts or hubs are journalled in openings in the arms 31 and wall 32 of the cage by suitable needle bearings and these cranks are spaced 180° to one another, as may be seen in Fig. 4. Each of the crank hubs carries a planetary gear 40 and 41, respectively, and clutching mechanisms 42 and 43 are provided between each hub and gear, respectively, for connecting the hubs with the gears so that the crank may rotate the gear in one direction only. Preferably, these clutching mechanisms consist of the well known roller type overrunning clutch, although other types of clutches could be used. The crank arms of the cranks 38 and 39 have cam follower blocks on the ends thereof which project into one race of an annular double, channel shaped cam member 45. The channel shaped cam 45 is circular and the diameter of the cam at the center line thereof is the same as the diameter of the orbit through which the axis of the cranks 38 and 39 are carried when the cage 27 is rotated on its axis. The cam member 45 is mounted on a plate 47 which is slidingly positioned in guide slots in the casing so that the cam may be moved eccentric to the orbit of rotation of the cranks, and mechanism indicated generally at 48 is provided for adjustably positioning the cam 45 relative to the cranks. It will be seen that when the cage 27 rotates with the cam 45 eccentric the cranks 38 and 39 will be oscillated, and in one direction of the oscillation they will be connected with the planetary gears 40 and 41, respectively.

Another set of cranks are mounted in arms 31a and end member 32a of the cage and these cranks, indicated at 38a and 39a, are similar in all respects to the cranks 38 and 39 and like parts are referred to by the same reference numerals but with the suffix "a." It will be noted that the cranks 38a and 39a are disposed 180° from one another but crank 38a is at 90° to crank 38 and crank 39a is 90° to crank 39. It is to be understood that the cranks 38a and 39a are connected with their respective planetary gears 40a and 41a by clutches similar to 42 and 43 and that the cranks engage cam 45 similar to the engagement of cranks 38 and 39 with the cam and are oscillated as described with reference to the latter cranks.

The planetary gears of the cranks 38 and 39 mesh with a sun gear 51 and the planetary gears of the cranks 38a and 39a mesh with a sun gear 52. The gears 51 and 52 are the inputs of differential gearing which includes two spider gears 53 and 54 which are rotatively mounted on hubs 55 and 56 which extend from the shaft 36. The gears 53 and 54 mesh with beveled gears 57 and 58 which are formed integral with the sun gears 51 and 52, respectively. It will be seen that when the cage 27 rotates counterclockwise, as viewed in Figs. 3 and 4 while the cam 45 is concentric to the axis of rotation of the cage, none of the cranks will be oscillated and the planetary gears will be held stationary relative to the cranks by the clutches and torque will be transmitted directly from the cage to the sun gears 51 and 52. Since these gears will be rotated in the same direction and at the same speed, the shaft 36 will be connected directly with the cage and it will rotate with the cage. One end of shaft 36 is journalled in bearings 59 located in a socket in the input shaft 19, and the other end of the shaft is keyed to a gear 76 which is journalled in a bearing 66. As the cam 45 is moved to an eccentric position, for example, in an upward direction, the cranks will be oscillated during each revolution of the cage and will thereby rotate the planetary gears on the latter's axis in a clockwise direction when the velocity of the crank hubs tend to exceed that of their respective associated planetary gears. Since the cranks are spaced angularly at 90°, each of the cranks will be effective to transmit torque to the sun gears 51 or 52 through its associated planetary gear during one-half of each revolution of the cage, and during the time the hub rotates in one direction, i. e., counterclockwise, as viewed in Fig. 3.

Referring to Fig. 8, the graph shown depicts the relative velocities of the various elements of the mechanism and it will be seen that during one revolution of the cage 27, the velocities of the hubs of the cranks 38, 39, 38a and 39a, which are indicated at V38, V39, V38a and V39a, respectively, vary in approximate sine wave fashion. Since the cranks are connected with their respective planetary gears by overrunning clutches the sun gear 51 will be driven alternately by cranks 38 and 39, depending on which crank is rotating counterclockwise at any given time. Thus, the velocity of the gear 51 will be that represented by the heavy line V51. The velocity of gear 51 will depend upon the degree of eccentricity of cam 45, but the torque effort applied thereto by the cranks alternately accelerates and decelerates according to the sine-like velocity curve of the cranks. The velocity of the gear 52 will be similar to that of gear 51 but the accelerations and decelerations will be 90° out of phase with those of gear 51 as is illustrated by heavy line V52 in Fig. 8. The velocity of the output shaft 36 of the differential gearing driven by sun gears 51 and 52 will be the algebraic sum of the velocities of these latter sun gears and referring to the graph of Fig. 8, line V36 illustrates the velocity of this output shaft. It will be noted that the shaft 36 has acceleration and deceleration periods of four per revolution of the cage 27 and the amplitude of the acceleration is indicated at $a$.

A second power output unit is located in the opposite end of the housing and it includes a cage 60 having a tubular portion 61 having oppositely disposed radially extending arms 62 and an end wall 63 spaced from the arms 62. The cage is journalled at one end by a bearing 64 mounted on a shaft 65 and at the opposite end it is journalled between two bearings 66, which are mounted on one end of shaft 36 and a second bearing 67 which is supported in an opening in a partition 68 in the housing 15. The cage 60 is adapted to be driven at twice the velocity of cage 27 and it is driven by the latter cage through an internal gear 70 which meshes with four pinions 71 mounted to the partition 68 by suitable bearings, and the pinions 71 mesh with a gear formation 72 formed on the inner end of the tubular part 61 of the cage 60. The cage 60 has two cranks 38b and 39b mounted thereon in arms 62 and wall 63, which cranks are similar to cranks 38 and 39 and which are disposed at 180° to one another. Preferably, these cranks are in line with cranks 38 and 39 and are 90° to cranks 38a and 39a respectively. The cranks 38b and 39b are adapted to be oscillated by a cam 45a which is similar to cam 45 except that it has but a single channel, and it receives cam follower projections on the crank ends for oscillating the cranks in the same manner as described with reference to cranks 38 and 39 as cage 60 revolves. The cam 45a is mounted on a plate 47a which is slidably mounted in guide slots in housing 15 and it is adapted to be moved eccentric in the same direction and at the same time as the cam 45, in such a manner that the hub velocities of the cranks 38b and 39b will closely approximate that of the cranks 38, 39, 38a and 39a. Both cams 45 and 45a, however, will be concentric with their respective cages at the same time.

The cranks 38b and 39b are adapted to drive planetary gears 40b and 41b, respectively, through overrunning clutches similar to clutches 42 and 43 and these planetary gears are in mesh with a sun gear 73. The sun gear 73 is journalled on shaft 65 by suitable needle bearings and it has a beveled gear 74 formed integral therewith and the beveled gear 74 forms one input for differential gearing indicated at 75. The other input of the differential gearing 75 consists of a beveled gearing 76 which is keyed to the end of shaft 36. Gears 74 and 76 are adapted to mesh with two differential gears 77 and 78 which are mounted on hubs 79 formed on shaft 65. It will be seen that the cage 60 will rotate in the opposite direction to cage 27 and that, therefore, the gear 74 will rotate at twice the speed of gear 76 when the cams 45 and 45a are in the concentric position. Also, these gears 74 and 76 will be rotating in opposite directions so that the resultant velocity of shaft 65 will be the algebraic sum of the gears 74 and 76 which will amount to one-half the velocity of gear 74. It will be seen that the cranks 38b and 39b will act through 180° of revolution of the cage 60 to transmit torque to their associated planetary gears, but since the cage 60 is rotating at twice the rate of cage 27, and in the opposite direction, the periodic acceleration and deceleration imparted to the sun gear 73 by reason of the crank oscillations will correspond in frequency to those imparted to the gear 76. Since gears 73 and 76 rotate in opposite directions, the periodic accelerations of one offsets the corresponding periodic accelerations of the other. This condition is illustrated in Fig. 8 wherein V60 indicates the velocity of cage 60, V38b and V39b indicates the velocities of the hubs of cranks 38b and 39b and the heavy line V73 indicates the velocity and direction of the gear 73 relative to that of shaft 36. The periodic accelerations and decelerations in speed of gear 73 will correspond in frequency to those of shaft 36 and gear 76, and by properly positioning cam 45a, the amplitude of these periodic variations shown at b, will be substantially the same as amplitude a, but of opposite phase. Thus, the velocity of the output shaft 65, being the algebraic sum of the velocities of gears 73 and 76, will be substantially constant for each adjustment of the cams 45 and 45a, assuming that the input at shaft 19 is constant. This velocity is illustrated at V65 in Fig. 8.

The shaft 65 has an internal gear 80 splined thereto which gear drives an output shaft 81 through a pinion gear 82 which is in mesh with gear 80 and which is journalled to a stud secured on the end wall 18 of the housing.

Any suitable mechanism may be provided for adjusting the eccentricities of the cams 45 and 45a so that cam 45a will effect an amplitude of oscillation of the cranks 38b and 39b to produce the amplitude of the periodic variations in speed of gear 73 which will always be in balance with the amplitude of the periodic variations in speed of gear 76. In the mechanism shown, there is a cam plate 90 arranged to slide longitudinally in slide ways 91 and 92 formed along the top of housing 15. The slideways 92 are formed in a cover 93 secured to housing 15. The cam plate 90 is provided with two inclined slots 95 and 96 which form cams for receiving rollers secured to the upper ends of projections 47 and 47a of cams 45 and 45a, respectively. The cams 45 and 45a will thus be elevated or lowered by sliding the plate 90 one direction or the other. The plate may be so moved by a rotatable rod 97 which is journalled in an end wall of the cover 93 and which is threaded into a threaded opening in the plate. Preferably the outer end of rod 97 is squared to receive a crank or the like for manual rotation of the rod. It will be understood that the slope of the cam slot 96 will be determined with relation to the slope of slot 95 so that the proper throw of cranks 38b and 39b will be effected for any given adjustment of cam 45, and in the drawings, the shape and slope of the cams are not necessarily correct for the results desired, but they merely illustrate one means for achieving the proper adjustment. Obviously, other means of manual or automatic adjustment of the cams 45 and 45a could be provided.

By my invention I have provided a transmission in which the speed transmission may be precisely regulated throughout a given range and with no appreciable variations in the constancy of the torque. Thus, the transmission is suitable for producing a constant output speed from a varying input or vice versa.

Although I have described but one form of the invention, other forms could be adopted, all falling within the scope of the claims which follow.

I claim:

1. In a torque transmission, a pair of power output units each comprising, a rotatable cage, a plurality of cranks carried by the cage and adapted to be translatably revolved about the axis of the cage as the cage rotates on its axis, an annular cam engaged by the ends of the crank arms of the cranks as the cranks are revolved about the axis of the cage, said cam being displaceable to a position eccentric to the axis of revolution of the cage whereby, when said cam is in an eccentric position, the cranks are oscillated as the cage revolves, planetary gears carried by the cage and each being associated with one of the respective cranks, a driven element including a sun gear, said sun gear meshing with the planetary gears, a clutch operable intermittently to connect each crank with its associated planetary gear during one phase of oscillation of the crank whereby the planetary gears will drive the sun gear at a velocity depending upon the velocity of the cage plus the increment or decrement of the velocity of the cranks at the time the respective cranks and their associated planetary gears are clutched, one of said units having its cranks, planetary and sun gears arranged in two sets, each set being equal in number of cranks, planetary and sun gears to those of the other unit and having the sun gears differentially connected with its driven element; means for driving said cages, the latter means being adapted to drive the cage of said other unit at twice the speed of the cage of the said one unit and in the opposite direction; and a differential mechanism comprising a pair of torque input elements differentially connected with a torque output, one of said input elements being driven by the driven element of one of said output units and the other input element being driven by the driven element of the other of said output units.

2. A speed transmission comprising, a rotatable cage; two sets of cranks mounted on the cage and adapted to oscillate, each set comprising a pair of cranks spaced 180° from one another; and the cranks of one set being spaced 90° from the respective cranks of the other set; a planetary gear associated with the respective cranks; clutch means for connecting the cranks with their respective associated planetary gears, said clutches being operative intermittently during oscillation of the cranks to transmit torque from the cranks to the gears in one direction; cam means engaged by said cranks, said cam means being displaceable to a position eccentric to the axis of rotation of the cage for oscillating said cranks when the cage revolves with said cam means being in an eccentric position; a pair of sun gears, one sun gear being in mesh with the planetary gears of one set of cranks and the other sun gear being in mesh with the planetary gears of the other set of cranks; a gear mechanism including two input gears arranged to differentially drive a differential gear mounted on a torque output shaft each of said input gears being driven by one of said sun gears; a second rotatable cage; a pair of cranks mounted on the second cage and adapted to oscillate, said cranks being spaced 180° to one another; a planetary gear associated with each of the last mentioned pair of cranks; clutch means for connecting the last mentioned cranks with their respective planetary gears, the last mentioned clutches being operative intermittently during oscillation of the cranks to transmit torque from the cranks to the gears in one direction; cam means engaged by the last mentioned cranks, the last mentioned cam means being displaceable to a position eccentric to the axis of rotation of the second cage for oscillating the cranks when the cage rotates with said cam means being in an eccentric position; a sun gear driven by the planetary gears associated with the last mentioned pair of cranks; a differential gearing including an input gear driven by the last mentioned sun gear, a second input gear driven by the output of the first mentioned differential gearing, and an output shaft carrying a gear differentially driven by the two last mentioned input gears; and means for driving said second cage at twice the velocity of the first mentioned cage and in the opposite direction.

3. A speed transmission as defined in claim 2 in which means is provided for simultaneously varying the eccentricity of both cam means.

4. In a speed transmission, a variable speed unit including a torque output having a velocity increasing and decreasing periodically above a predetermined velocity; a pair of input gears; an output gear differentially driven by the input gears, one of said input gears being driven by said torque output; and means for periodically increasing and decreasing the velocity of the other of said input gears corresponding in time and rate characteristics to the periodic decreasing and increasing, respectively, of the velocity of the torque output of said variable speed unit, the rate of the periodic increasing and decreasing of the velocity of said other input gear being in correspondence respectively with the rate of the periodic decreasing and increasing of the velocity of the torque output of of said variable speed unit at any given moment whereby the output gear is driven at a velocity constant with respect to said certain minimum velocity.

5. In a speed transmission, a variable speed unit including a torque output having a velocity increasing and decreasing periodically above a predetermined velocity; a pair of input gears; an output gear differentially driven by the input gears, one of said input gears being driven by said torque output; means for periodically increasing and decreasing the velocity of the other of said input gears corresponding in time and rate characteristics to the periodic decreasing and increasing, respectively, of the velocity of the torque output of said variable speed unit, the rate of the periodic increasing and decreasing of the velocity of said other input gear being in correspondence respectively with the rate of the periodic decreasing and increasing of the velocity of the torque output of said variable speed unit at any given moment whereby the output gear is driven at a velocity constant with respect to said certain minimum velocity; and means for simultaneously varying the periodic velocities of said variable speed torque output and the velocity of said other input gear for varying said certain minimum velocity.

6. A speed transmission comprising, a torque output; a torque unit having a torque output member the velocity of which periodically increases and decreases above a predetermined velocity during operation of the transmission; torque means comprising a member periodically varying in velocity with the periods of increasing and decreasing velocity corresponding in time and rate characteristics to the periods of decreasing and increasing velocity, respectively, of the torque output of said unit; and coupling means between said torque unit and torque means, the last mentioned coupling means being operative to offset the periodic increases and decreases of the torque output of said unit by the periodic decreases and increases, respectively,of said torque means, whereby the velocity of the torque output of said transmission is constant relative to said certain minimum velocity.

7. A speed transmission comprising, a torque output; a torque unit having a torque output member the velocity of which periodically increases and decreases above a predetermined velocity during operation of the transmission; torque means comprising a member periodically varying in velocity with the periods of increasing and decreasing velocity corresponding in time and rate characteristics to the periods of decreasing and increasing velocity, respectively, of the torque output of said unit; control means for said torque unit and torque means for simultaneously adjusting the amplitudes of the periodically increasing and decreasing velocities of said torque output member and said torque means whereby said predetermined velocity may be changed as desired; and coupling means between said torque unit and torque means, the last mentioned coupling means being operative to offset the periodic increases and decreases of the torque output of said unit by the periodic decreases and increases, respectively, of said torque means, whereby the velocity of the torque output of said transmission is constant relative to said certain minimum velocity.

8. In a speed transmission, a variable speed unit including a torque output having a rotary velocity varying periodically above a certain minimum velocity; a second variable speed unit including a torque output having a rotary velocity which varies periodically below a predetermined maximum velocity, the periods of variation of the last mentioned velocity being in correspondence with the velocity variation periods of the first mentioned unit, but of opposite values at any given time; a pair of input gears; an output gear differentially driven by the input gears, one of said input gears being driven by said torque output of the first mentioned unit, and the other input gear being driven by the torque output of the second unit; and means for simultaneously varying the velocities of the output of said units.

9. A speed transmission of the character defined in claim 8 in which the predetermined maximum velocity of second named unit exceeds the minimum velocity of the first unit.

JOSEPH H. EGY.

REFERENCES CITED

The following references are of record in the file of this patent:

UNITED STATES PATENTS

| Number | Name | Date |
| --- | --- | --- |
| 2,178,784 | Ewart | Nov. 7, 1939 |

FOREIGN PATENTS

| Number | Country | Date |
| --- | --- | --- |
| 833,533 | France | July 25, 1938 |